US006477894B1

(12) United States Patent
Koch et al.

(10) Patent No.: US 6,477,894 B1
(45) Date of Patent: *Nov. 12, 2002

(54) METHOD FOR PREPARING AN INNERLINER OF A PNEUMATIC TIRE FOR THE QUICK BONDING OF AN ELECTRONIC MONITORING DEVICE

(75) Inventors: Russell W. Koch, Hartville, OH (US); Paul B. Wilson, Murfreesboro, TN (US); Michelle R. Stalnaker, Phoenix, AZ (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 191 days.

This patent is subject to a terminal disclaimer.

(21) Appl. No.: 09/613,130

(22) Filed: Jul. 10, 2000

Related U.S. Application Data

(63) Continuation of application No. 09/205,931, filed on Dec. 4, 1998, now abandoned.

(51) Int. Cl.[7] .............................................. G01M 17/02
(52) U.S. Cl. ....................................................... 73/146
(58) Field of Search ................................ 73/146, 146.5; 152/64, 152.1, 330, 510; 156/97, 123; 340/58, 539, 442–447

(56) References Cited

U.S. PATENT DOCUMENTS

| | | | |
|---|---|---|---|
| 3,232,330 A | 2/1966 | Puls ............................ 152/330 |
| 3,787,806 A | 1/1974 | Church ......................... 340/58 |
| 3,873,965 A | 3/1975 | Garcia .......................... 340/58 |
| 4,010,354 A | 3/1977 | Apicella, Jr. et al. ... 235/61.6 R |
| 4,067,235 A | 1/1978 | Markland et al. ........... 73/146.5 |
| 4,160,234 A | 7/1979 | Karbo et al. .................. 340/58 |
| 4,237,728 A | 12/1980 | Betts et al. ................. 73/146.5 |
| 4,246,567 A | 1/1981 | Miller .......................... 340/58 |
| 4,334,215 A | 6/1982 | Frazier et al. ............... 340/539 |
| 4,570,152 A | 2/1986 | Melton et al. .................. 340/58 |
| 4,578,992 A | 4/1986 | Galasko et al. ............. 73/146.5 |
| 4,588,978 A | 5/1986 | Allen ........................... 340/58 |
| 4,717,905 A | 1/1988 | Morrison, Jr. et al. ........ 340/58 |
| 4,851,809 A | 7/1989 | McAlister ................... 340/442 |
| 4,862,486 A | 8/1989 | Wing et al. .................... 377/16 |
| 4,911,217 A | 3/1990 | Dunn et al. ............... 152/152.1 |
| 4,938,645 A | 7/1990 | Wollar ........................ 411/508 |
| 4,953,393 A | 9/1990 | Galasko et al. ............. 73/146.5 |
| 5,160,383 A | 11/1992 | Gartland et al. ............ 152/510 |
| 5,181,975 A | 1/1993 | Pollack et al. ........... 152/152.1 |

(List continued on next page.)

FOREIGN PATENT DOCUMENTS

| | | |
|---|---|---|
| CA | 2227083 | 7/1998 |
| EP | 0 505 905 A1 | 9/1992 |
| EP | 0 544 136 A1 | 6/1993 |
| EP | 0 595 549 A2 | 5/1994 |
| EP | 0 639 472 A1 | 2/1995 |
| EP | 0 689 950 A2 | 1/1996 |
| FR | 2 661 373 | 10/1991 |
| WO | WO 99/29524 | 6/1999 |
| WO | WO 99/29525 | 6/1999 |
| WO | WO 99/41093 | 8/1999 |
| WO | WO 99/53740 | 10/1999 |
| WO | WO 00/07834 | 2/2000 |
| WO | WO 00/08598 | 2/2000 |

*Primary Examiner*—William Oen
(74) *Attorney, Agent, or Firm*—John M. Vasuta; Michael Sand

(57) ABSTRACT

A method for preparing an innerliner of a pneumatic tire and adhering an electronic monitoring device to the innerliner includes the step of providing a patch having a cover and a layer of uncured rubber. The patch is placed at a selected area of the innerliner of a green tire before the green tire is cured. At least a portion of the patch is removed after the tire is cured to provide a prepared area at the selected area of the tire. The electronic monitoring device is then adhered to the prepared area.

15 Claims, 10 Drawing Sheets

U.S. PATENT DOCUMENTS

| | | | |
|---|---|---|---|
| 5,218,861 A | 6/1993 | Brown et al. | 73/146.5 |
| 5,348,067 A | 9/1994 | Myatt | 152/152.1 |
| 5,468,108 A | 11/1995 | Sullivan et al. | 411/510 |
| 5,479,171 A | 12/1995 | Schuermann | 342/44 |
| 5,483,827 A | 1/1996 | Kulka et al. | 73/146.5 |
| 5,500,065 A | 3/1996 | Koch et al. | 156/123 |
| 5,562,787 A | 10/1996 | Koch et al. | 156/64 |
| 5,573,610 A | 11/1996 | Koch et al. | 152/152.1 |
| 5,573,611 A | 11/1996 | Koch et al. | 152/152.1 |
| 5,587,698 A | 12/1996 | Koch et al. | 340/442 |
| 5,708,411 A | 1/1998 | Hill | 340/447 |
| 5,718,025 A | 2/1998 | Courtin | 24/453 |
| 5,731,754 A | 3/1998 | Lee, Jr. et al. | 340/447 |
| 5,749,984 A | 5/1998 | Frey et al. | 152/415 |
| 5,877,679 A | 3/1999 | Prottey | 340/442 |
| 5,960,844 A | 10/1999 | Hamaya | 152/152.1 |
| 6,244,104 B1 * | 6/2001 | Koch et al. | 73/146 |

* cited by examiner

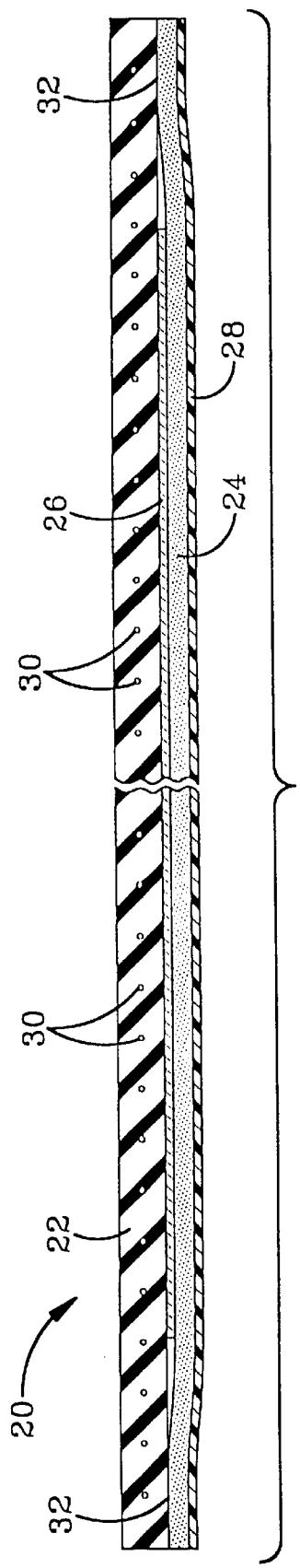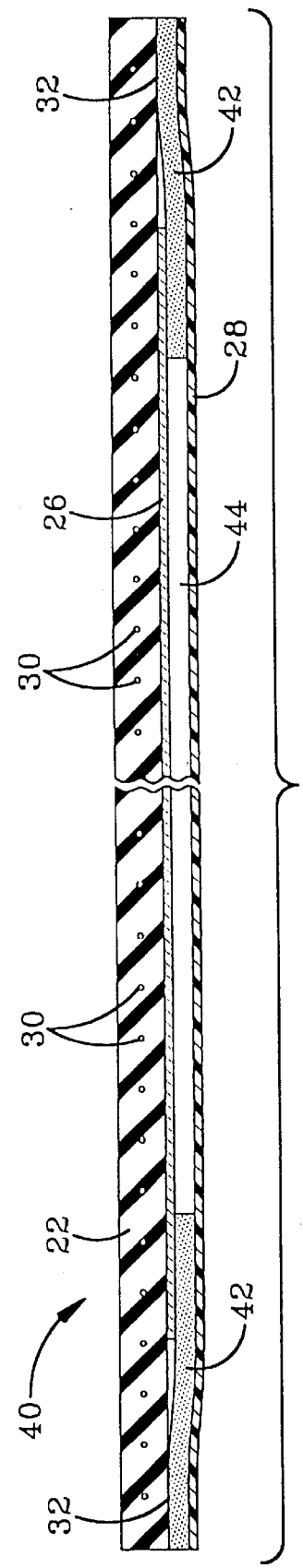

METHOD FOR PREPARING AN INNERLINER OF A PNEUMATIC TIRE FOR THE QUICK BONDING OF AN ELECTRONIC MONITORING DEVICE

CROSS-REFERENCE TO RELATED APPLICATION

This application is a continuation application of U.S. Patent application Ser. No. 9/205,931 filed Dec. 4, 1998, now abandoned titled Method for Preparing an Innerliner of a Pneumatic Tire for the Quick Bonding of an Electronic Monitoring Device; the disclosures of which are incorporated herein by reference.

BACKGROUND OF THE INVENTION

1. Technical Field

The present invention generally relates to pneumatic tires and, more particularly, to methods of attaching electronic monitoring devices to the innerliner of a pneumatic tire. Specifically, the present invention relates to a method of preparing the innerliner of a pneumatic tire so that a monitoring device may be securely attached to the innerliner of the tire.

2. Background Information

It is desired in the art to monitor the conditions of tires while they are installed and in use on a particular vehicle. It is particularly desirable to measure tire wear, internal temperature, and internal pressure. Other desirable measurements may be the number of tire rotations that have occurred in given time. These measurements are preferably capable of being taken while the tire is in use without having to remove the tire from the vehicle or otherwise interrupt the use of the vehicle to take the measurements. It is particularly desirable to monitor the conditions and statistics on large off-the-road truck tires because the off-the-road tires are expensive and subject to harsher conditions than typical passenger car tires. The off-the-road tires on large trucks and other vehicles also must be regularly maintained to maximize vehicle efficiency.

Numerous types of such monitoring devices are known in the art. One type of known monitoring device uses a passive integrated circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active, self-powered programmable electronic devices are disclosed in U.S. Pat. Nos. 5,500,065, 5,573,610, 5,562,787, and 5,573,611 which are assigned to the assignee of the present application.

One problem common to each of these monitoring devices is the problem of attaching the monitoring device to the tire. The attachment problem is difficult when the monitoring device is attached to the inside surface of the tire, the outside surface of the tire, or imbedded within the body of the tire. The attachment problem is difficult because the forces on the electronic device are significant and numerous. Tires not only are subjected to rotational forces when the vehicle is moving but also are subjected to various impact forces when the tire contacts bumps or surface irregularities. The attachment of the monitoring device to the tire must be strong enough and secure enough to maintain the position of the monitoring device with respect to the tire while experiencing all of these forces while also protecting the monitoring device from damage resulting from these forces.

Another problem with the attachment of a monitoring device to a tire is that the tire must be balanced about its rotational axis to efficiently perform. The monitoring device itself already adds weight to the tire requiring the tire to be counterbalanced. It is thus desired to minimize the weight of the attachment so that additional counterbalancing weights do not have to be added to the tire. It is thus desired to provide an attachment that is strong and secure while being small and lightweight.

Another problem experienced with attaching a monitoring device to a pneumatic tire is that the surface where the monitoring device is being anchored is often not stable. Tires are designed to flex and stretch to accommodate various pressures and forces. The attachment of the monitoring device to the tire must accommodate the movement and stretching of the tire surface where the monitoring device is connected. Such accommodation must last throughout the life of the tire and function at a wide range of temperatures and pressures.

A further problem experienced in connecting a monitoring device to a pneumatic tire is that tires are manufactured on automated assembly lines. The attachment method must be able to be relatively easily engineered into the existing automated tire assembly lines to be useful. As such, the method of attaching the monitoring device to the pneumatic tire cannot include any manual steps or steps that require precise component manipulation.

Another problem with attaching a monitoring device to a tire is that the innerliner of a pneumatic tire does not readily bond with an adhesive. The material used to fabricate innerliners is selected to create a good fluid-impervious barrier that retains air within the pneumatic tire. The material is not, however, selected because it is conducive to adhesion. There have thus been problems in the art in connecting the relatively heavy monitoring device to the innerliner in a manner that securely anchors the monitoring device without destroying the innerliner. Although buffing the innerliner to create a textured surface is effective with selected innerliners, the innerliners on many tires cannot be buffed because they are too thin. It is thus desired in the art to provide a method for preparing the innerliner of a pneumatic tire so that a monitoring device may be quickly and easily securely attached to the prepared area.

SUMMARY OF THE INVENTION

In view of the foregoing, it is an objective of the present invention to provide a method for preparing the innerliner of a tire so that a monitoring device can be easily bonded or adhered to the innerliner in a manner that allows the monitoring device to be securely connected throughout the life of the tire.

Another objective of the invention is to provide a method for preparing the innerliner of a tire wherein the preparation steps can be performed in an existing automated tire assembly line.

A further objective of the invention is to provide a method for preparing the innerliner of a tire for adhering an electronic monitoring device without damaging the function of the tire innerliner.

Another objective of the invention is to provide a method for preparing the innerliner of a tire for adhering an electronic monitoring device wherein the prepared surface will hold a secure connection of the electronic monitoring device when the tire experiences various forces while in use.

Another objective of the invention is to provide a method for preparing the innerliner of a tire for adhering an electronic monitoring device wherein the preparation of the innerliner adds little weight to the tire.

A further objective of the invention is to provide a method for preparing the innerliner of a tire for adhering an electronic monitoring device that will accommodate the stretching and movement of the innerliner when the tire is in use.

Another objective of the invention is to provide a method for preparing the innerliner of a tire for adhering an electronic monitoring device where the method may be performed at a variety of locations on the innerliner.

A further objective of the invention is to provide a method for preparing the innerliner of a pneumatic tire for adhering an electronic monitoring device that achieves the stated objectives in a simple, effective, and inexpensive manner, that solves the problems, and that satisfies the needs existing in the art.

These and other objectives and advantages of the invention are achieved by a method for preparing an innerliner of a pneumatic tire for adhering of an electronic monitoring device, the method including the steps of placing a patch on the innerliner of a green tire at a selected location; and curing the green tire to provide a prepared area at the selected location.

BRIEF DESCRIPTION OF THE DRAWINGS

The preferred embodiments of the invention, illustrative of the best mode in which applicants contemplate applying the principles of the invention, are set forth in the following description and are shown in the drawings and are particularly and distinctly pointed out and set forth in the appended claims.

FIG. 2 is a sectional view of a first embodiment of a patch used to prepare the innerliner by the method of the present invention;

FIG. 4 is a sectional view of a second embodiment of a patch used to prepare the innerliner by the method of the present invention;

Similar numbers refer to similar parts through the specification.

DESCRIPTION OF THE PREFERRED EMBODIMENTS

Figure 1:
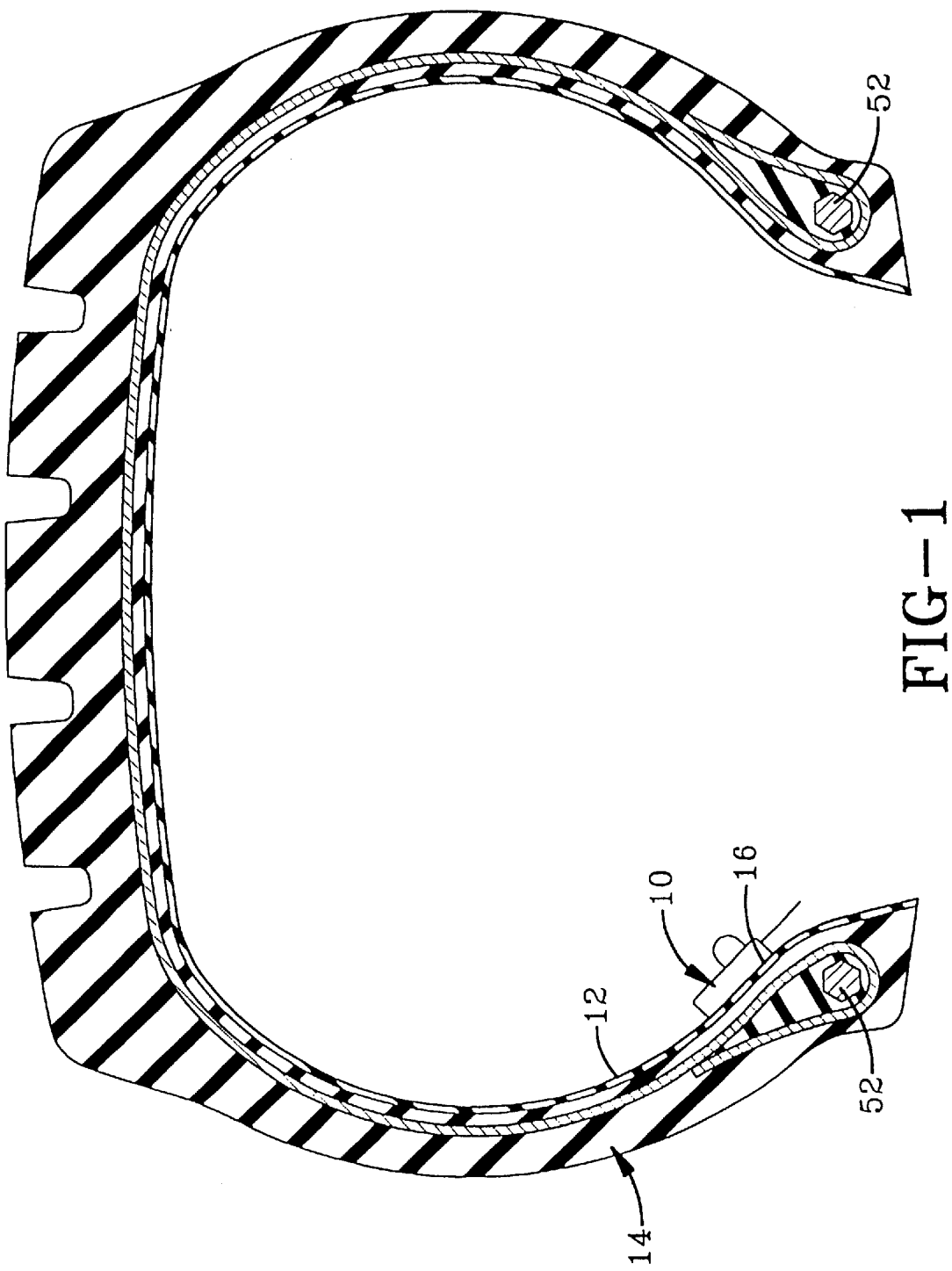
FIG. 1 is a sectional view of a pneumatic tire having an electronic monitoring device connected to the innerliner of the tire.
Figure 3:
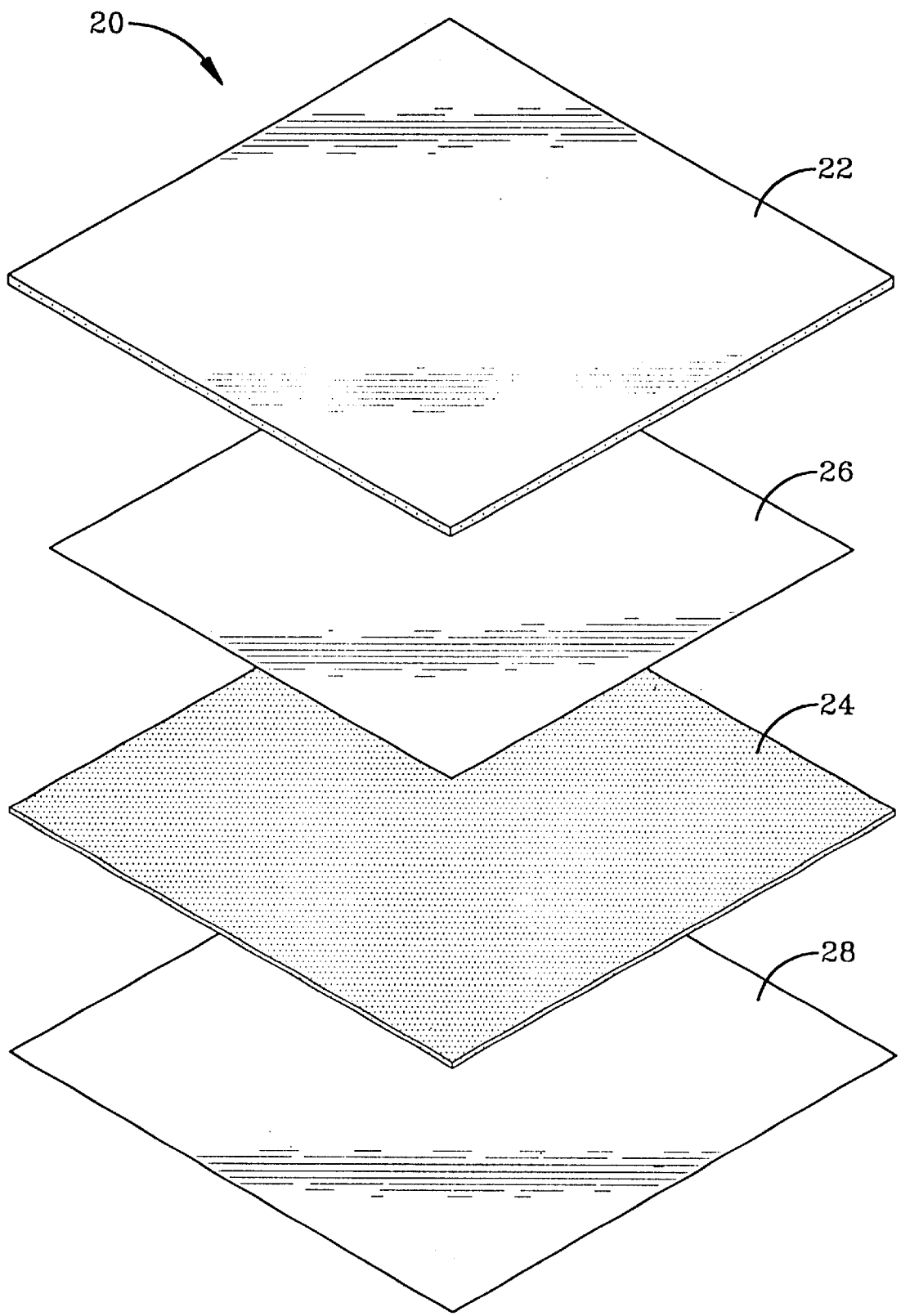
FIG. 3 is a exploded perspective view of the first embodiment of the patch of FIG. 2 used to prepare the innerliner by the method of the present invention.

An encapsulated electronic monitoring device 10 is connected to the innerliner 12 of a cured tire 14 as shown in FIG. 1. Tire 14 may be an off-the-road tire, a truck and bus radial tire, or any of a variety of tires known in the art. Device 10 is connected to a prepared area 16 of innerliner 12 that increases or maximizes adhesion between device 10 and innerliner 12. Prepared area 16 is created by using the method and apparatus of the present invention.

In accordance with one of the objectives of the present invention, an anchoring patch 20 is disclosed that is used to create prepared area 16 on innerliner 12. Anchoring patch 20 includes a cover 22 and a layer of uncured rubber 24. Cover 22 is preferably in the form of a layer of cured rubber 22. Cover 22 may also be fabricated from other flexible materials known in the art such as synthetics and metals. For instance, a mylar, plastic, metal foil, metal screen, or a polyurethane may be used to form cover 22. A layer of cure material such as cure paper 26 or cure cloth 26 is disposed between cover 22 and layer 24 to prevent uncured rubber 24 from curing into cured rubber 22 when tire 14 is cured. Patch 20 may further include a release cover 28 connected to uncured rubber 24 to prevent uncured rubber 24 from becoming dirty and adhering to items prior to its use. Release cover 28 is preferably fabricated from polyethylene so that it may easily release from the layer of uncured rubber 24.

Uncured rubber layer 24 is preferably a dual cure rubber that may be cured either with heat or appropriate chemicals. Instead of a dual cure rubber, uncured rubber layer 24 may be simply a heat-curing rubber or a chemically-curing rubber. Layer 24 may also be a natural rubber, styrene-butadiene rubber, butadiene rubber, nitrile rubber, or combinations thereof. Other rubbers also may be used without departing from the concepts of the present invention.

Anchoring patch 20 may be fabricated in numerous sizes and thicknesses depending on the size of tire 14 and innerliner 12 and the size and weight of encapsulated electronic monitoring device 10. In one embodiment, patch 20 is approximately 4 inches by 4 inches with layer of cured rubber 22 being as approximately 0.028 inches thick, layer of cure paper 26 being 0.005 inches thick, layer of uncured rubber 24 being approximately 0.012 inches thick, and cover 28 being 0.005 inches thick. The approximate total thickness of patch 20 is thus 0.05 inches thick. These dimensions are provided for the purpose of disclosing an example of the invention with other dimensions being contemplated.

As may be seen in FIG. 2, cover 22 preferably is reinforced with a plurality of fibers or cords 30 that may be fabricated from nylon, polyester, aramide, or other fibers that can be used to reinforce rubber. Reinforcing cords 30 may be linearly disposed or may be disposed in a mesh. Cover 22 may be fabricated from essentially any type of conventional rubber. Layer of cure paper or cure cloth 26 preferably is treated with silicone. Only one side of cure paper 26 is coated with the silicone and it is adjacent uncured rubber layer 24. The silicone allows cover 22 and cure material 26 to be easily removed from uncured rubber layer 24 as will be described below.

Cure material 26 does not extend entirely to the edges of cover 22 such that there is direct contact between cover 22 and layer 24 as indicated by numeral 32. The direct contact about the peripheries of cover 22 and layer 24 keeps patch 20 from falling apart because of the adhesive properties of uncured rubber 24. It is preferred that cover 22 and layer 24 are connected to each other as at 32 entirely around there peripheries. A connection 32 along only one edge of layers 22 and 24 also functions to maintain the position of layers 22, 24, and 26.

Figure 5:
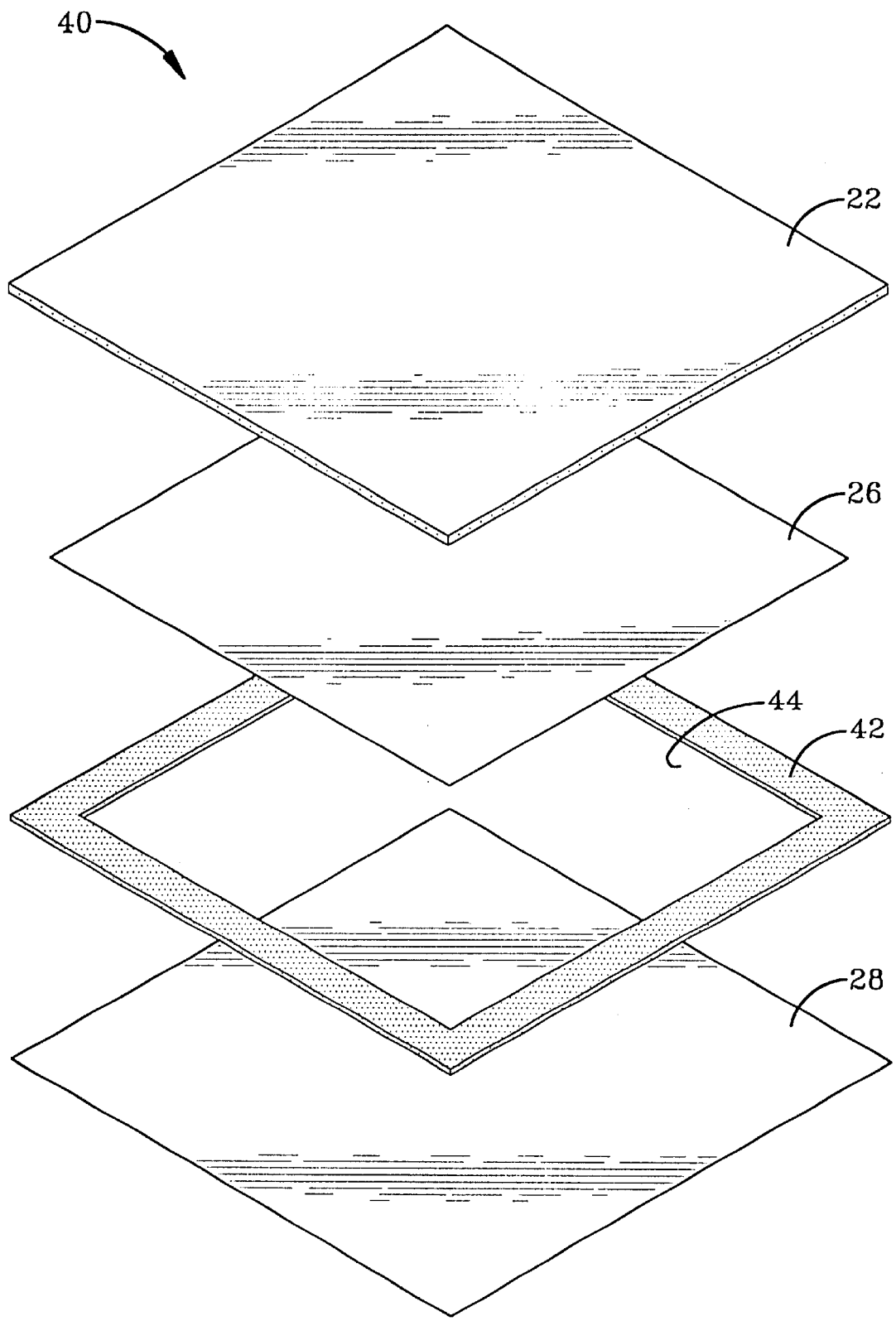
FIG. 5 is an exploded perspective view of the second embodiment of the patch of FIG. 4 used to prepare the innerliner by the method of the present invention.

A second embodiment of the anchoring patch of the present invention is depicted in FIGS. 4 and 5 and is indicated generally by the numeral 40. Patch 40 includes substantially the same cured rubber cover 22, cure material 26, and release cover 28 as in first patch embodiment 20. In accordance with another objective of the present invention, second patch embodiment 40 includes a frame of uncured rubber 42 disposed between release cover 28 and cure material layer 26. Frame 42 forms an opening 44 that allows cure material 26 to contact the surface on which patch 40 is placed after release cover 28 is removed. The overall dimensions of patch 40 may be substantially similar to patch 20 and cover 22 and frame 42 are connected as indicated by numeral 32, to maintain the integrity of patch 40 when it is not in use.

Patches 20 and 40 are used in substantially the same manner to create prepared area 16 of innerliner 12 so that electronic monitoring device 10 may be connected to prepared area 16. As such, the method of using patches 20 and 40 will be primarily described with respect to patch 20 with only the unique results of the use of patch 40 being described in detail. The first step of creating prepared area 16 on innerliner 12 is to provide patch 20 having the construction described above. Patch 20 is connected to a selected area of innerliner 12 on a green tire 50. The selected area is the area where electronic monitoring device 10 is preferably positioned. Although not required, it is often preferred to locate monitoring device 10 adjacent the bead ring 52 of tire 14. As such, selected area is positioned adjacent bead ring 52 on green tire 50.

Figure 6:
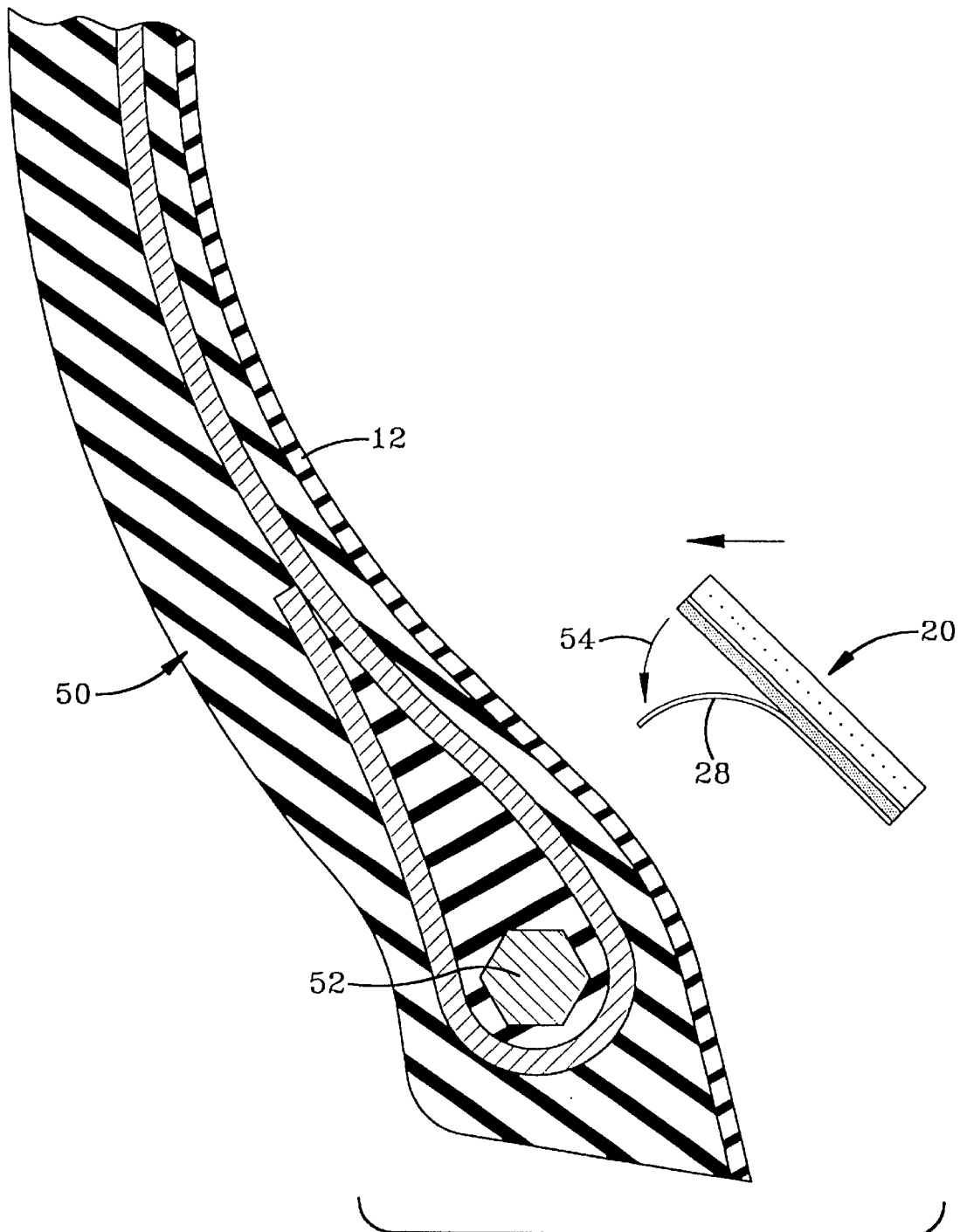
FIG. 6 is an enlarged exploded sectional view of a selected area of a green tire and of a patch just prior to being applied to the tire by the method of the present invention.
Figure 7:
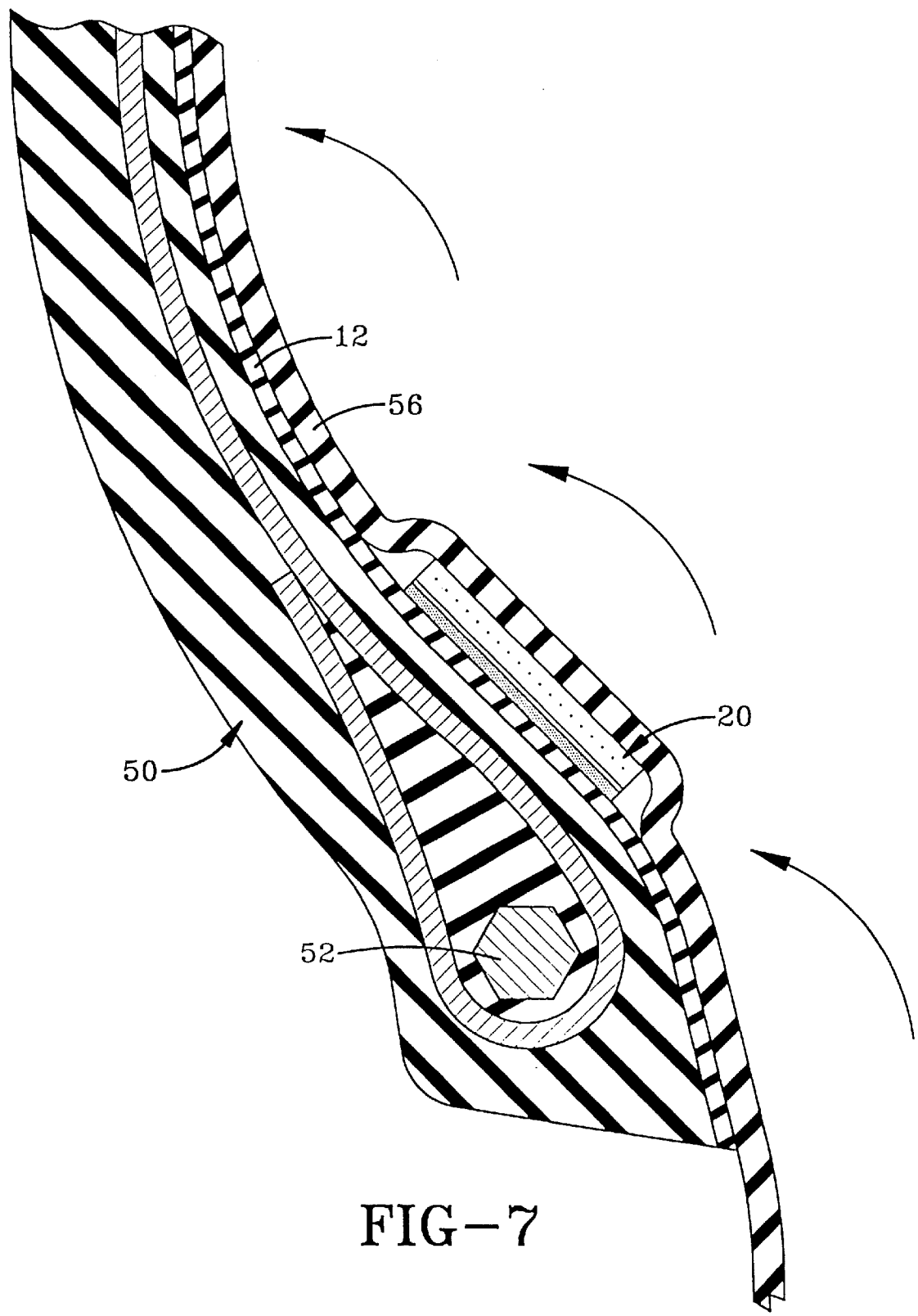
FIG. 7 is a view similar to FIG. 6 showing a tire curing bladder pushing the patch against the innerliner during curing of the green tire.

After the area is selected on green tire 50, release cover 28 is removed as shown in FIG. 6 by arrow 54. Release cover 28 may be easily pealed back off patch 20. Once release cover 28 is removed, patch 20 is placed on selected area of innerliner 12 and adhered thereto by the natural adhesion of uncured rubber layer 24. In some situations, it may be desirable to stitch patch 20 to innerliner 12 to maintain a secure connection between the patch and innerliner. The stitching may be performed manually or automatically.

Green tire 50 is then cured by a known curing process. When green tire 50 is cured, an inflatable bladder 56 is positioned inside green tire 50 and inflated to create an outwardly directed force on green tire 50 to maintain its correct shape. The interior of green tire 50 is coated with a release agent to prevent bladder 56 from sticking or bonding to green tire 50. Bladder 56 thus presses patch 20 against innerliner 12 while green tire 50 is being cured. The curing process of green tire 50 cures layer 24 to innerliner 12. Layer 24 does not adhere to cover 22 because of the presence of cure material 26.

Figure 8:
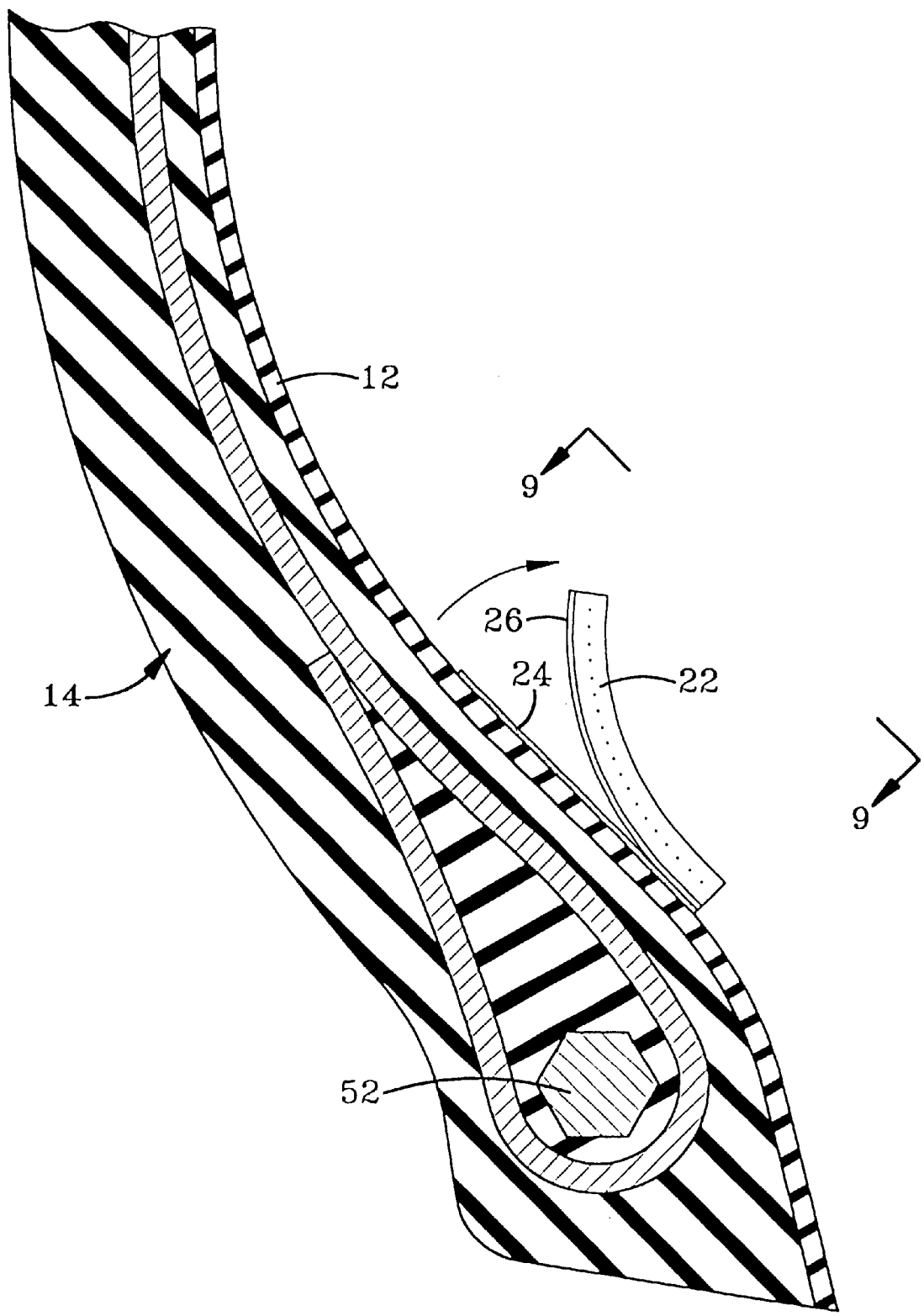
FIG. 8 is a view similar to FIG. 6 showing the patch in the process of being removed from the innerliner of the tire after the tire has been cured.
Figure 9:
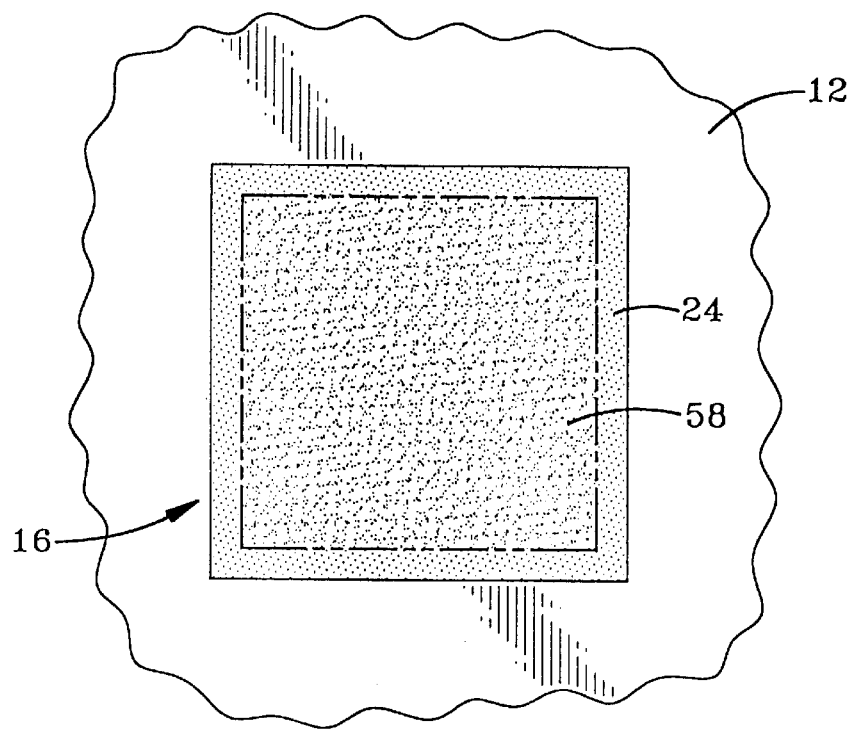
FIG. 9 is a plan view of the area of the innerliner that has been treated by the patch, the view taken along line 9–9 of FIG. 8.

After green tire 50 is cured to form tire 14, cover 22 and cure material 26 are removed from layer 24 (now cured) as shown in FIG. 8, to form an anchoring layer or prepared area 16. The removal step may occur at any time after green tire 50 has been cured. Cover 22 prevents prepared area 16 from becoming dirty or from being coated with the release agent used during the curing process. The removal of cover 22 and layer 26 leaves anchoring layer 24 (now cured) deposited on the selected area of innerliner 12 where encapsulated monitoring device 10 will be connected. As shown in FIG. 9, the removal of cure material 26 from layer 24 (now cured) leaves a textured area 58 where cure material 26 contacted layer 24. Both layer 24 (now cured) and textured area 58 are good surfaces for adhering monitoring device 10 because they have desirable adhesive properties. Layer 24 having textured area 58 thus forms prepared area 16 where device 10 may be connected to innerliner 12.

Figure 11:
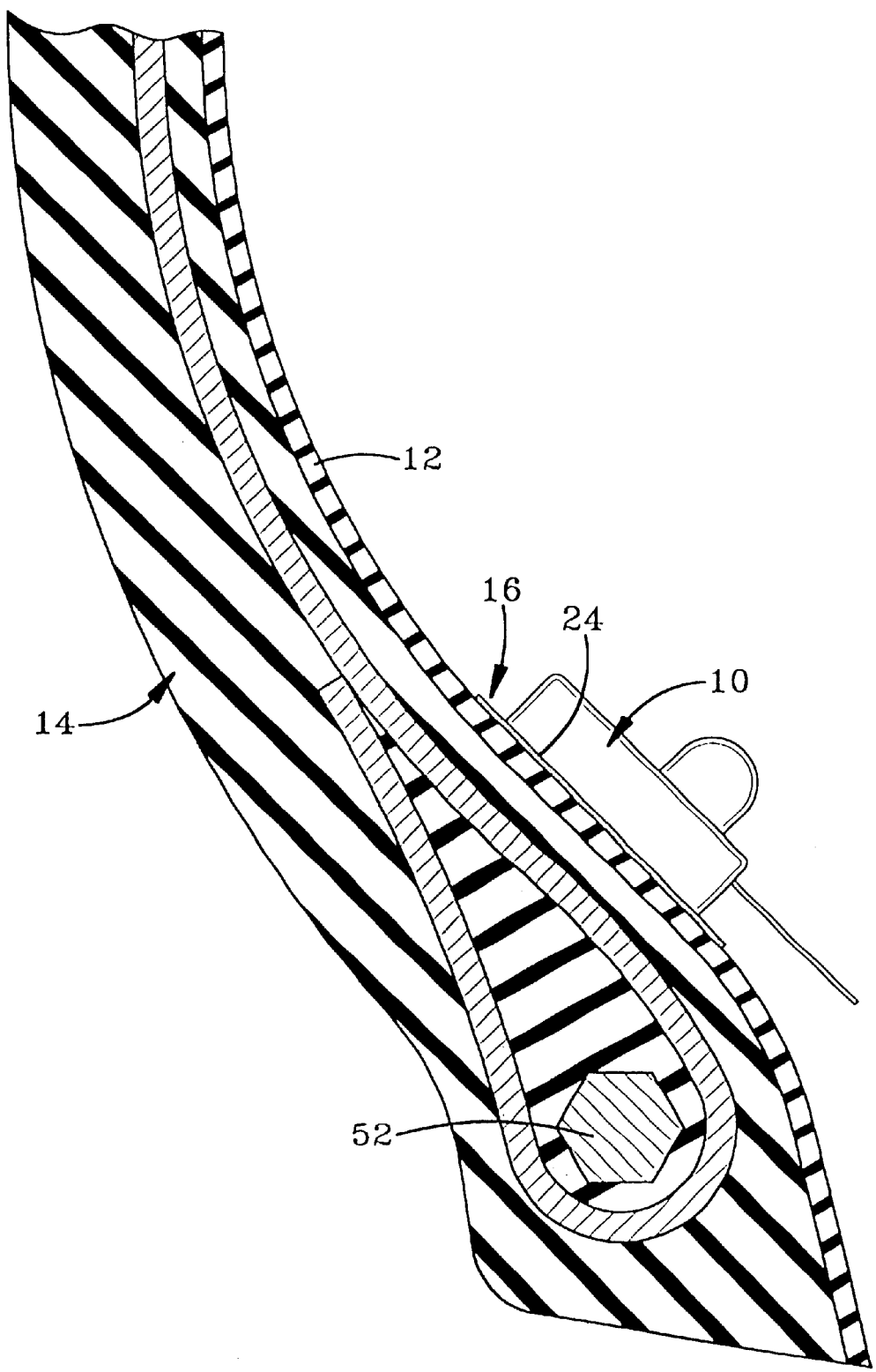
FIG. 11 is a view showing the connection of the monitoring device directly to the treated portion of the innerliner.
Figure 12:
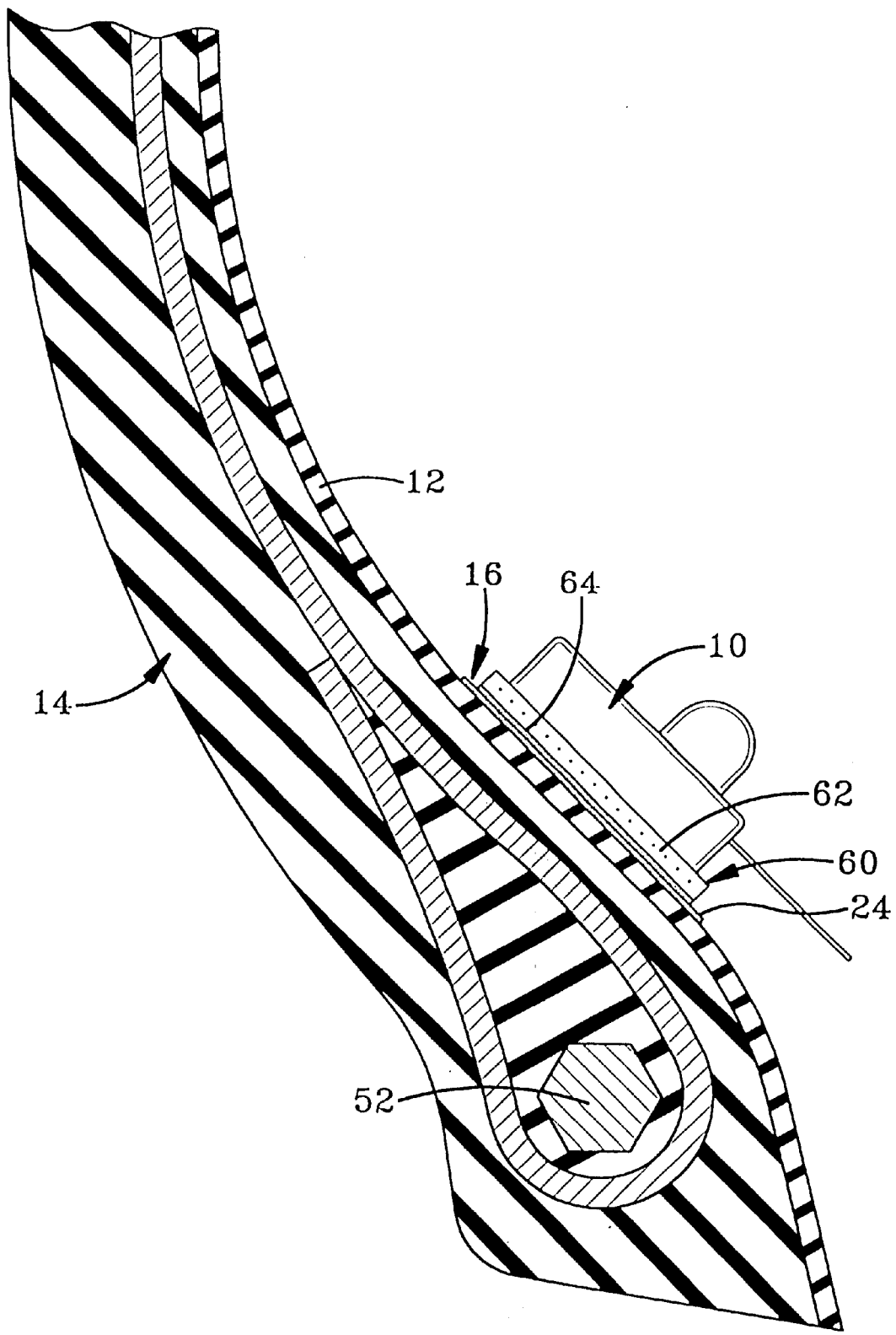
FIG. 12 is a view of the monitoring device having an attachment patch connected to the treated portion of the innerliner.

A direct connection between encapsulated monitoring device 10 and prepared area 16 is depicted in FIG. 11 where an adhesive is used to directly bond monitoring device 10 to prepared area 16. In the preferred embodiment of the invention, device 10 is connected to prepared area 16 with an attachment patch 60 as depicted in FIG. 12. Attachment patch 60 includes a layer of cured rubber 62 connected to a layer of uncured rubber 64. Device 10 may be connected to layer 62 by a suitable attachment or securing means such as an adhesive. Attachment patch 60 may then be adhered to prepared area 16 by applying an activator fluid on each layer 24 and 64 and then pressing layers 24 and 64 together to allow the activator fluid to cure layers 24 and 64 together. The bonding between layers 24 and 64 create a strong, secure connection between device 10 and innerliner 12. Layers 24 and 64 may also be cured together using heat and pressure. In such an embodiment, a heated bladder may be used to press layer 64 against layer 24 while supplying a suitable amount of heat to cure the two layers together.

Figure 10:
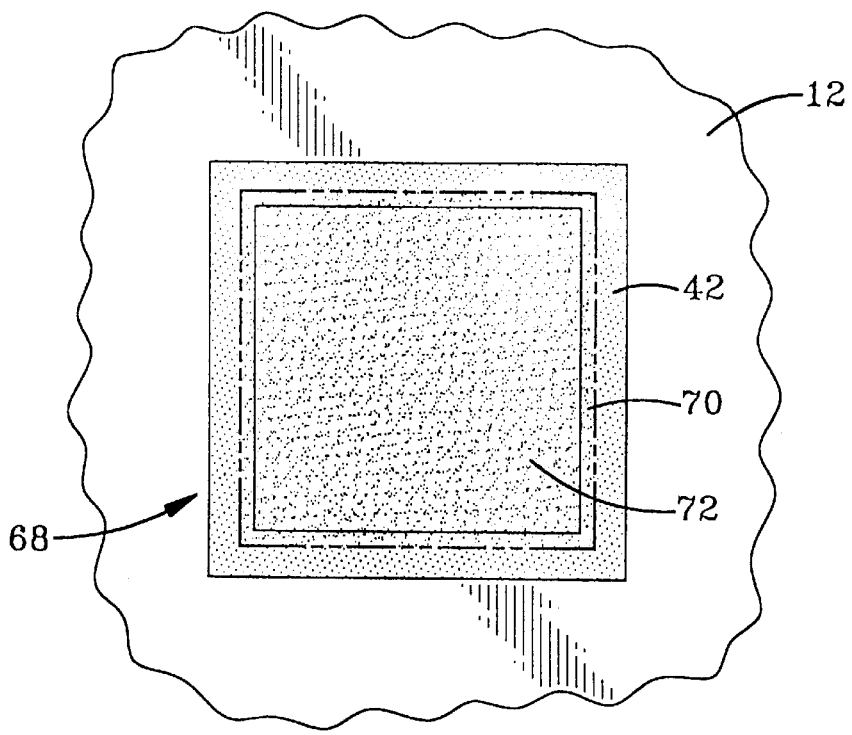
FIG. 10 is a view similar to FIG. 9 showing an innerliner that was treated by the second embodiment of the patch of the present invention.

When second patch embodiment 40 is used during the tire curing process, prepared area 68 appears as depicted in FIG. 10. As explained above with respect to uncured rubber layer 42, frame 42 is deposited onto innerliner 12 during the curing process. Opening 44 allows cure material 26 to directly contact innerliner 12 during the curing process. When cover 22 and cure material 26 are removed, cure material 26 textures a portion 70 of frame 42 and the portion 72 of innerliner 12 that was exposed to material 26. Prepared area 68 thus includes frame 42, a textured portion of rubber 70, and a textured portion of innerliner 72. Monitoring device 10 may be bonded to prepared area 68 by the two methods described above or by other methods known in the art.

Accordingly, the improved method for preparing an innerliner of a pneumatic tire for the quick bonding of an electronic monitoring device is simplified, provides an effective, safe, inexpensive, and efficient device that achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the method for preparing an innerliner of a pneumatic tire for the quick bonding of an electronic monitoring device is achieved, the characteristics of the construction, and the advantageous new and useful results obtained; the new and useful structures, devices, elements, arrangements, parts, combinations and methods are set forth in the appended claims.

What is claimed is:

1. A method for preparing an area on the inner surface of a pneumatic tire for the mounting of an electronic monitoring device to the inner surface of the pneumatic tire; the method comprising the steps of:

providing a green tire having an inner surface;

selecting a location of the inner surface of the pneumatic tire to mounted the electronic monitoring device;

placing a mounting preparation element on the inner surface of the pneumatic tire at the selected location; and curing the green tire whereby the mounting preparation element provides a prepared area on the inner surface at the selected location.

2. The method of claim 1, further comprising the step of removing at least a portion of the mounting preparation element from the inner surface after the green tire has been cured.

3. The method of claim 2, further comprising the step of providing the mounting preparation element with a layer of cure material.

4. The method of claim 2, further comprising the step of providing the mounting preparation element with at least a layer of rubber.

5. The method of claim 4, further comprising the step of providing the layer of rubber with cords.

6. The method of claim 1, further comprising the steps of:

inserting a bladder into the green tire while the green tire is being cured; and protecting the selected area with the mounting preparation element during the curing step.

7. The method of claim 6, further comprising the step of removing at least a portion of the mounting preparation element after the green tire is cured.

8. A method for preparing an area on the inner surface of a pneumatic tire for the mounting of an electronic monitoring device to the inner surface of the pneumatic tire; the method comprising the steps of:

providing a green tire having an inner surface;

selecting a location of the inner surface of the pneumatic tire to mounted the electronic monitoring device;

placing a preparation element on the inner surface of the pneumatic tire at the selected location; the element having a first surface area facing the innerliner;

curing the green tire whereby the mounting preparation element provides a prepared area on the inner surface at the selected location; and pressing the entire first surface area of the element against the innerliner during the curing step to prepare the area.

9. The method of claim 8, further comprising the step of removing at least a portion of the element after the green tire is cured.

10. The method of claim 9, further comprising the step of providing the element with at least a layer of cure material.

11. The method of claim 10, further comprising the step of providing the element with at least a layer of rubber.

12. A method for preparing an area on the inner surface of a pneumatic tire for the mounting of an electronic monitoring device to the inner surface of the pneumatic tire; the method comprising the steps of:

providing a green tire having an inner surface;

selecting a location of the inner surface of the pneumatic tire to mounted the electronic monitoring device;

placing a mounting preparation element on the inner surface of the pneumatic tire at the selected location without covering the electronic monitoring device with the mounting preparation element;

curing the green tire whereby the mounting preparation element provides a prepared area on the inner surface at the selected location; and protecting the selected area during the curing step with the mounting preparation element.

13. The method of claim 12, further comprising the step of fabricating at least a portion of the mounting preparation element from a cured material.

14. The method of claim 12, further comprising the step of removing at least a portion of the mounting preparation element after the curing step.

15. The method of claim 12, further comprising the step of providing the mounting preparation element with a layer of uncured rubber.

* * * * *